| United States Patent [19] | [11] Patent Number: 4,465,712 |
| McVie | [45] Date of Patent: Aug. 14, 1984 |

[54] SILOXANE-POLYESTER COMPOSITIONS AND USE THEREOF

[75] Inventor: James McVie, Barry, England

[73] Assignee: Dow Corning Limited, Barry, England

[21] Appl. No.: 568,867

[22] Filed: Jan. 6, 1984

[30] Foreign Application Priority Data

Jan. 19, 1983 [GB] United Kingdom ................. 8301374

[51] Int. Cl.$^3$ .............................................. B05D 3/02
[52] U.S. Cl. .................................. 427/387; 427/388.1;
427/393.5; 524/761; 524/765; 524/773;
524/860; 524/869; 525/446; 525/477; 528/15;
528/18; 528/34
[58] Field of Search ................. 525/446, 477; 528/18,
528/15, 34; 427/387, 388.1, 393.5; 524/860,
869, 765, 761, 773

[56] References Cited

U.S. PATENT DOCUMENTS

| 3,935,154 | 1/1976 | Cawley | 525/446 |
| 4,122,074 | 10/1978 | Pepe et al. | 525/446 |
| 4,278,783 | 7/1981 | Taniyama et al. | 525/446 |
| 4,370,441 | 1/1983 | Gaske et al. | 525/446 |

*Primary Examiner*—Melvyn I. Marquis
*Attorney, Agent, or Firm*—Robert L. McKellar

[57] ABSTRACT

Siloxane-polyester compositions comprising (A) a siloxane-polyester copolymer, (B) a solvent for the siloxane-polyester copolymer, (C) a silane wherein one of the groups attached to silicon contains at least one amino group and (D) a silane having 3 or 4 alkoxy or alkoxyalkoxy groups attached to silicon any remaining groups being hydrocarbon or hydrocarbon ether groups.

The compositions may also contain a siloxane condensation catalyst and are useful for coating substrates such as metals and plastics.

9 Claims, No Drawings

SILOXANE-POLYESTER COMPOSITIONS AND USE THEREOF

This invention relates to compositions comprising siloxane-polyester copolymers and to the use of such compositions for coating substrates.

Compositions based on the copolymerisation products of siloxanes and polyesters have been known and used for many years. Such siloxane-polyester copolymers have found application mainly in coating compositions, particularly in protective and decorative paints for metals such as mild steel and aluminium. Although compositions based on a siloxane-polyester copolymers have been relatively successful from the commercial aspect they require baking for long periods (e.g. 1–2 hours) and/or at high temperatures (e.g. 250° C.) in order to achieve a cured coating having optimum hardness and abrasion resistance. The provision of such high temperature or extended curing schedules is costly in terms of energy and/or the occupation time of the curing oven. There has therefore existed a need for improved siloxane-polyester compositions which can be cured employing milder conditions without sacrificing the desired properties in the cured product.

According to this invention there is provided a composition which comprises (A) a siloxane-polyester copolymer resin having on average at least two $\equiv$SiOH and/or $\equiv$COH groups per molecule, (B) one or more organic solvents for the siloxane-polyester copolymer, (C) a silane of the general formula

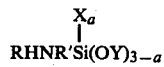

wherein R represents a hydrogen atom, an alkyl group having from 1 to 4 inclusive carbon atoms or an aliphatic hydrocarbon group attached to the nitrogen atom through a carbon to nitrogen bond and containing at least one amino group, R' represents an alkylene group having from 3 to 6 inclusive carbon atoms, X represents a monovalent hydrocarbon group having from 1 to 6 inclusive carbon atoms, Y represents an alkyl or an alkoxyalkyl group having less than 6 carbon atoms and a has a value of 0 or 1 and (D) a silane of the general formula $Q_nSi(OZ)_{4-n}$ wherein Q represents a monovalent group having less than 10 carbon atoms and composed of carbon and hydrogen or of carbon, hydrogen and oxygen wherein the oxygen is present in the form of one or more ether linkages, Z represents an alkyl group having from 1 to 6 inclusive carbon atoms or an alkoxyalkyl group having from 3 to 6 carbon atoms and n has a value of 0 or 1, or a partial hydrolysis and condensation product of the said silane.

Included within the scope of the invention is a process for preparing the said compositions by forming a mixture comprising components (A) to (D), and a process for coating a substrate which comprises applying thereto a composition according to this invention.

The siloxane-polyesters (A) employed in the production of the compositions of this invention can be prepared by known procedures. They are generally prepared by preforming the siloxane and polyester precursors and thereafter heating these together in the presence of a suitable solvent. As the siloxane precursor there can be used low molecular weight organosiloxanes having silicon-bonded groups reactive with the hydroxyl groups in the polyester precursor. The organic groups in the siloxane are usually lower alkyl e.g. methyl, ethyl and propyl, or phenyl, or mixtures of such groups, preferably methyl and phenyl. The reactive groups in the siloxane are generally hydroxyl, alkoxy or alkoxyalkoxy e.g. methoxy, ethoxy, propoxy and methoxyethoxy. Such organosiloxane precursors are well known and a number are commercially available. They include, for example, alkoxylated polymers of monophenylsiloxane units, alkoxylated copolymers of monophenylsiloxane and dimethylsiloxane units, alkoxylated copolymers of phenylmethylsiloxane and monomethylsiloxane units, alkoxylated copolymers of phenylmethylsiloxane and monophenylsiloxane units, hydroxylated copolymers of phenylmethylsiloxane and monoethylsiloxane units and hydroxylated copolymers of monophenylsiloxane units and monopropylsiloxane units. The siloxane polymer and copolymer precursors can be prepared by known procedures, for example by the hydrolysis or cohydrolysis of the corresponding alkoxy silanes and condensation of the hydrolysis product.

The hydroxyl-containing polyesters which are reacted with the siloxane precursor are also well known materials. They can be obtained by the reaction of one or more aromatic dicarboxylic acids, normally phthalic acid, isophthalic acid or terephthalic acid, or esters and anhydrides thereof, with one or more dihydric or polyhydric alcohols having from 2 to 8 carbon atoms, for example ethylene glycol, 1,2-propylene glycol, glycerol, trimethylpropane, trimethylolethane, pentaerythritol and cyclohexanedimethanol. If desired a saturated aliphatic dicarboxylic acid may be incorporated into the polyester although such addition is kept to a minimum where maximum hardness in the copolymer is required.

During the preparation of the siloxane-polyester the reaction may be expedited by the inclusion of a catalyst such as butyl titanate or propyl zirconate. In order to provide for the presence of residual $\equiv$SiOF and/or $\equiv$COH groups in the siloxane-polyester the reaction between the siloxane and polyester reactants should be carried only so far as is consistent with the desired proportion of these groups in the copolymer. It is preferred to employ a solvent for the reaction, some of which at least can remain as the, or as part of the, solvent (B) for the siloxane-polyester. The ratios of siloxane and polyester precursors employed in the preparation of the copolymer resin will depend upon the balance of properties desired in the copolymer. For example the copolymer can be prepared employing 15 - 80% by weight of siloxane and 85 - 20% by weight of polyester. In general, however, the preferred copolymers are those comprising 35 - 80% by weight of siloxane and 65 - 20% by weight of polyester. Examples of siloxane-polyesters which may be employed as ingredient (A) of the compositions of this invention and methods for their preparation are described in U.K. Pat. Nos. 815 107, 1 070 174, 1 346 864 and 1 485 368.

The compositions of this invention contain one or more solvents (B) for the siloxane-polyester. Examples of solvents which can be employed are xylene, toluene, benzene, alcohols e.g. isopropanol and n-butanol, the ethers and esters of ethylene glycol, for example ethylene glycol monoethyl ether, ethylene glycol dimethyl ether, ethylene glycol monoethylether acetate and diethylene glycol monoethylether acetate; the preferred solvents being the lower monohydric alcohols and the ethers of the ethylene and propylene glycols. The proportion of solvent employed is not critical and will depend on the intended use of the compositions. Where very thin coatings are desired the solvent may comprise the major proportion of the weight of the composition, for example up to about 85% by weight. Lower proportions of solvent e.g. down to about 20% may be employed where the application calls for a thicker deposition of siloxane polyester.

Ingredient (C) of the compositions of this invention is a silane having silicon-bonded hydrocarbonoxy groups and a silicon-bonded hydrocarbon group (preferably having no more than 12 carbon atoms) containing at least one amino group. In the general formula of the silane R may be hydrogen, lower alkyl or an aliphatic group containing at least one amino group, for example the group $H_2NQ$-, wherein Q is a divalent hydrocarbon group e.g. $-CH.CH_3CH_2-$, $-(CH_2)_4-$ or $-(CH_2)_5-$, or the group $-(CH_2CH_2NH)_zH$ wherein z is 0 or an integer, preferably 1 or 2. The substituent Y may represent, for example, methyl, ethyl or methoxyethyl. Preferred as ingredient (C) are compounds represented by the formula $$H_2N(CH_2)_2NHR'Si(OY)_3$$

and $$H_2NR'Si(OY)_3$$

wherein R' represents  or $-CH_2.CH_3CHCH_2-$ and each Y represents methyl, ethyl or methoxyethyl. The silane (C) may be employed in a proportion of from about 5 to about 50%, preferably 10 to 40% by weight based on the weight of the siloxane-polyester (A).

Compartment (D) of the compositions comprises one or more silanes  wherein Q represents a hydrocarbon group having from 1 to 9 carbon atoms for example, methyl, ethyl, propyl, vinyl or phenyl. The group Q may also contain oxygen in the form of an ether group, for example as the group $-C-O-C-$ and/or as an oxirane ring. Each Z represents for example methyl, ethyl, butyl or methoxyethyl. Examples of the operative silanes (D) are therefore methyltrimethoxysilane, methyltriethoxysilane, vinyl trimethoxysilane, phenyl triethoxysilane, tetraethoxysilane and tetraisopropoxysilane. The preferred silanes are those wherein Z represents the methoxyethyl or ethoxyethyl groups, for example vinyl tris(methoxyethoxy) silane and tetrakis-(methoxyethoxy) silane. Also operative are the products obtained by the partial hydrolysis and condensation of the said silanes, such as ethyl polysilicate and isopropyl polysilicate. Typically the silane and/or its partial hydrolysis and condensation product, is employed in a proportion of from 2 to 20% by weight, preferably 4 to 10% by weight, based on the weight of the siloxane-polyester (A).

In addition to ingredients (A) to (D) the compositions of this invention preferably also contain a siloxane condensation catalyst (E), for example a carboxylic acid salt of a metal, including the organometal salts and salts of mono- and di-carboxylic acids. Examples of such salts are lead octoate, lead naphthenate, stannous octoate, iron octoate, iron stearate, antimony octoate, stannous acetate, dibutyltin dilaurate, dibutyltin di(2-ethylhexoate) and dibutyltin diversatate. The preferred metal carboxylates are the tin carboxylates, particularly those derived from lauric and octoic acids. The proportion of catalyst employed is not narrowly critical, from about 0.25% to about 5% by weight, based on the weight of the siloxane-polyester (A) being preferred.

Preparation of the compositions of this invention is carried out by mixing ingredients (A) to (D) and, where appropriate, the catalyst (E). In practice the siloxane-polyester copolymer is normally prepared as a solution in one or more organic solvents. In accordance with conventional techniques the solvent content of the solution may be adjusted to the desired level during or following the preparation of the copolymer by the removal or addition of solvent, including the replacement or partial replacement of the original solvent, or solvents, with other solvents. To avoid premature curing of the composition the amino silane (C) and the catalyst (E) are preferably not mixed with the siloxane-polyester (A) until the composition is required for use. Thus, the solvent solution of the siloxane-polyester copolymer and components (C), (D) and (E) may be individually packaged for storage and shipment and mixed in the desired proportions at the time of use. Alternatively (C) and (D), and the catalyst (E) if present, may be packaged together but separately from the solvent solution of the siloxanepolyester (A) and the two packages mixed in the desired proportions when the composition is to be used. If such a method of packaging is employed the mixture of (C), (D) and the catalyst should be maintained in a substantially moisture-free condition if maximum storage life is desired.

The compositions of this invention are particularly adapted for the formation of protective and decorative coatings on metals e.g. steel, aluminium and copper, plastics e.g. acrylics and polycarbonates and other substrates to which they may be applied employing any appropriate technique, for example brushing, spraying, dip coating, roller coating and flow coating. They may be employed as clear coating materials or may be dyed or pigmented to any desired colour. Thin films of the composition may be cured to hard, adherent, abrasion resistant coatings at temperatures as low as about 80° C., whereas siloxane-polyester compositions not containing (C) and (D) generally require a temperature of at least 190° C. to 200° C. to produce comparable cured coatings in a commercially acceptable time.

The following examples, in which the parts are expressed by weight, illustrate the invention.

EXAMPLE 1

A polyester resin (100 parts) prepared by reacting, according to conventional techniques, trimethylpropane (70.4 parts) and dimethylterephthalate (44.0 parts) and having 8% by weight of hydroxyl groups was mixed with a low molecular weight methylphenylsiloxane (150 parts) having a phenyl to methyl ratio of 1.3/1 and a silicon-bonded hydroxyl content of about 7% by weight, cellosolve acetate (167 parts) and tetraisopropyl titanate (0.3 part). The mixture was heated for 4 hours to 150° C. to provide a fully compatible siloxane-polyester copolymer having residual —SiOH and —COH groups. The solids content of the siloxane-polyester copolymer was adjusted to approximately 30% by weight by the addition of butanol (208 parts) and 2-ethoxyethanol (208 parts).

The silane $H_2NCH_2CH_2NH(CH_2)_3Si(OCH_3)_3$ (4 parts) was mixed with $Si(OCH_2CH_2OCH_3)_4$ (0.5 part) and a 50% by weight solution of dibutyltin dioctoate (0.75 part). This mixture (5.25 parts) was then added with stirring to 25 parts of the siloxane-polyester copolymer solution prepared as described above and the resulting solution employed to coat aluminium panels by dipping. The panels were then placed in an air circulating oven at 80° C. for 2 hours. The coating on the panels cured to a hard film having a thickness of 5 microns and a pencil hardness rating F.

The cured film did not soften when rubbed 200 times with a cheese cloth soaked in methylethyl ketone and wrapped around a 570 g ball hammer. The film exhibited a reverse impact strength (measured according to British Standard BS 1391) of approximately 30 cm per 450 g. When the corrosion resistance of the film was measured according to ASTM Standard B287-62 a value of 50 hours was obtained.

EXAMPLE 2

Two siloxane-polyester compositions were prepared as described in Example 1 except that in one case the proportion of dibutyltin dioctoate solution was reduced to 0.25 part (Composition A) and in the other it was omitted (Composition B). The compositions were applied to aluminium panels which were then placed in an oven at 80° C. for 2 hours.

The coated panels (coating thickness 7 microns) were then rubbed with a cloth soaked in methylethyl ketone. The film obtained employing Composition A did not soften after 200 rubs. The film obtained from Composition B survived 150 rubs prior to softening.

EXAMPLE 3

Aluminium panels were coated employing the procedure and compositions of Example 1 except that the tetra (methoxyethoxy) silane was replaced by the same weight of $Si(OCH_2CH_3)_4$ and the coating was cured for 1 hour at 100° C.

The film had a pencil hardness rated F and did not soften when rubbed 200 times with a cloth soaked in methylethyl ketone as described in Example 1.

EXAMPLE 4

Aluminium panels were coated employing the composition and procedure of Example 1 except that the amino silane was replaced by the same weight of $NH_2(CH_2)_3Si(OCH_2CH_3)_3$. The cured coating had a pencil hardness rating F and withstood 100 rubs with a cloth soaked in methylethyl ketone before softening occured.

When the procedure was repeated and the film cured at 100° C. for 30 minutes it withstood rubbing 200 times without softening.

That which is claimed is:

1. A composition which consists essentially of (A) a siloxane-polyester copolymer resin having on average at least two groups per molecule selected from ≡SiOH groups and ≡COH groups, (B) one or more organic solvents for the siloxane-polyester copolymer, (C) a silane of the general formula $$RHNR'Si(OY)_{3-a}^{X_a}$$

wherein R represents a hydrogen atom, an alkyl group having from 1 to 4 inclusive carbon atoms or an aliphatic hydrocarbon group attached to the nitrogen atom through a carbon to nitrogen bond and containing at least one amino group, R' represents an alkylene group having from 3 to 6 inclusive carbon atoms, X represents a monovalent hydrocarbon group having from 1 to 6 inclusive carbon atoms, Y represents an alkyl or an alkoxyalkyl group having less than 6 carbon atoms and a has a value of 0 or 1 and (D) a silane of the general formula $Q_nSi(OZ)_{4-n}$ wherein Q represents a monovalent group having less than 10 carbon atoms and composed of carbon and hydrogen or of carbon, hydrogen and oxygen wherein the oxygen is present in the form of one or more ether linkages, Z represents an alkyl group having from 1 to 6 carbon atoms or an alkoxyalkyl group having from 3 to 6 carbon atoms and n has a value of 0 or 1, or a partial hydrolysis and condensation product of the said silane.

2. A composition as claimed in claim 1 wherein the siloxane-polyester copolymer resin consists essentially of from 35 to 80% by weight of siloxane and 65 to 20% by weight of polyester.

3. A composition as claimed in claim 1 wherein the silane (C) has the general formula $$H_2N(CH_2)_2NHR'Si(OY)_3, \text{ or}$$

$$H_2NR'Si(OY)_3$$

wherein R' represents $-(CH_2)_3-$ or $-CH_2.CH_3CHCH_2-$ and each Y represents methyl, ethyl or methoxyethyl.

4. A composition as claimed in claim 1 which also contains (E) a siloxane condensation catalyst.

5. A composition as claimed in claim 4 wherein the siloxane condensation catalyst is a tin carboxylate.

6. A process for preparing a composition which comprises mixing a solution of a siloxane-polyester resin (A) in one or more organic solvents (B) with a silane (C) and a further silane (D), (A), (B), (C) and (D) being as defined in claim 1.

7. A process for coating a substrate which comprises applying to the substrate a composition as claimed in claim 1 and thereafter curing the applied composition.

8. A process as claimed in claim 7 wherein the composition also contains a siloxane condensation catalyst.

9. A process as claimed in claim 8 wherein the surface of the substrate is of metal or plastic.

* * * * *